(12) United States Patent
Chen

(10) Patent No.: US 7,109,893 B2
(45) Date of Patent: Sep. 19, 2006

(54) NOTEBOOK COMPUTER WITH A DETACHABLE KEYBOARD

(75) Inventor: Jung-Hung Chen, Keelung (TW)

(73) Assignee: Mitac Technology Corp., (TW)

( * ) Notice: Subject to any disclaimer, the term of this patent is extended or adjusted under 35 U.S.C. 154(b) by 649 days.

(21) Appl. No.: 10/199,636

(22) Filed: Jul. 18, 2002

(65) Prior Publication Data

US 2004/0012509 A1   Jan. 22, 2004

(51) Int. Cl.
*H03K 17/94* (2006.01)
(52) U.S. Cl. .................... 341/22; 361/680; 400/685; 400/691
(58) Field of Classification Search ............... 341/22; 361/680, 683; 400/685, 691
See application file for complete search history.

(56) References Cited

U.S. PATENT DOCUMENTS

| 6,762,931 | B1 * | 7/2004 | Chen ......................... 361/683 |
| 6,853,543 | B1 * | 2/2005 | Moore et al. ............... 361/680 |
| 2003/0021083 | A1 * | 1/2003 | Landry et al. ............. 361/683 |

* cited by examiner

*Primary Examiner*—Timothy Edwards, Jr.
(74) *Attorney, Agent, or Firm*—Merchant & Gould P.C.

(57) ABSTRACT

A notebook computer with a detachable keyboard has an independent keyboard module that connects to the main body of the computer through a conductive line. The keyboard module has a bottom section equipped with at least one support bracket. When in use, the keyboard module may be detached from the main body, and through the support bracket raised to a desired angle to conform to ergonomics so that users may comfortably operate the keyboard without becoming fatigued.

24 Claims, 7 Drawing Sheets

NOTEBOOK COMPUTER WITH A DETACHABLE KEYBOARD

FIELD OF THE INVENTION

The invention relates to a notebook computer and particularly to a notebook computer that has a modularized keyboard that may be detached from the notebook computer main body when in use and raised to a selected angle to facilitate user operations.

BACKGROUND OF THE INVENTION

With the flourishing development of computers these days, portable computers have become essential working and business tools for many people. Computer manufacturers have constantly reduced the size of portable computers. Now many portable computers are reduced to the size of notebooks and are almost as powerful as desktop computers. These notebook computers can be carried in attache cases or handbags to meet the requirements of business people anytime anywhere.

The biggest difference between notebook computers and desktop computers is their display devices. The display device on a notebook computer has to be small, light, thin and consume less electricity. Its manufacturing technology is much more complex than conventional display devices which use cathode ray tubes. In order to reduce costs, notebook computers generally are equipped with passive matrix type color display devices or active matrix type color display devices. The power supply for notebook computers is generally provided by NiMH or NiCd batteries. High end models can be coupled with Li-ion batteries, which have a longer service time span and no memory loss. Some types of batteries can last three to four hours. A few types can even last up to ten hours. For business people who have to travel frequently, those notebook computers offer great value as they can be used while traveling.

In order to make notebook computers convenient, most notebook computers have keyboards directly installed on the notebook computer main body. The keyboards thus constructed cannot be adjusted to a desired usage angle. As a result, their designs are not ergonomic for human operation, and tend to make people's hands fatigue easily. Although there are some detachable keyboards being developed, they are mainly for remote operation or become independent elements that are not restrictive to the notebook computer main body. In terms of ergonomics, there is still no effective design at present.

SUMMARY OF THE INVENTION

In view of the aforesaid disadvantages, the primary object of the invention is to provide a notebook computer with a detachable keyboard that may be adjusted to a desired angle to conform to ergonomics and alleviate users' hand fatigue during operation.

The notebook computer with a detachable keyboard according to the invention includes a notebook computer main body and a keyboard module. The notebook computer main body has a housing chamber for holding the keyboard module. The keyboard module is electrically connected to the notebook computer main body through a conductive line (or via wireless means). The keyboard module has a bottom section equipped with a support bracket. When in use, the keyboard module may be detached from the notebook computer main body, and through the support bracket on the bottom section lifted to a desired angle to conform to ergonomics so that users may comfortably operate the keyboard without feeling fatigue.

In addition, the support bracket located on the bottom section of the keyboard module may include an anchor board and a leg bracket. The anchor board has one end forming a pivotal connection seat and another end with a plurality of anchor slots formed thereon. The leg bracket is foldable and has one end pivotally engaging with the pivotal connection seat and another end anchoring on one of the anchor slots to support the keyboard module at different angles so that users may make adjustments based on their requirements and desires.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

DESCRIPTION OF THE PREFERRED EMBODIMENTS

Figure 1A:
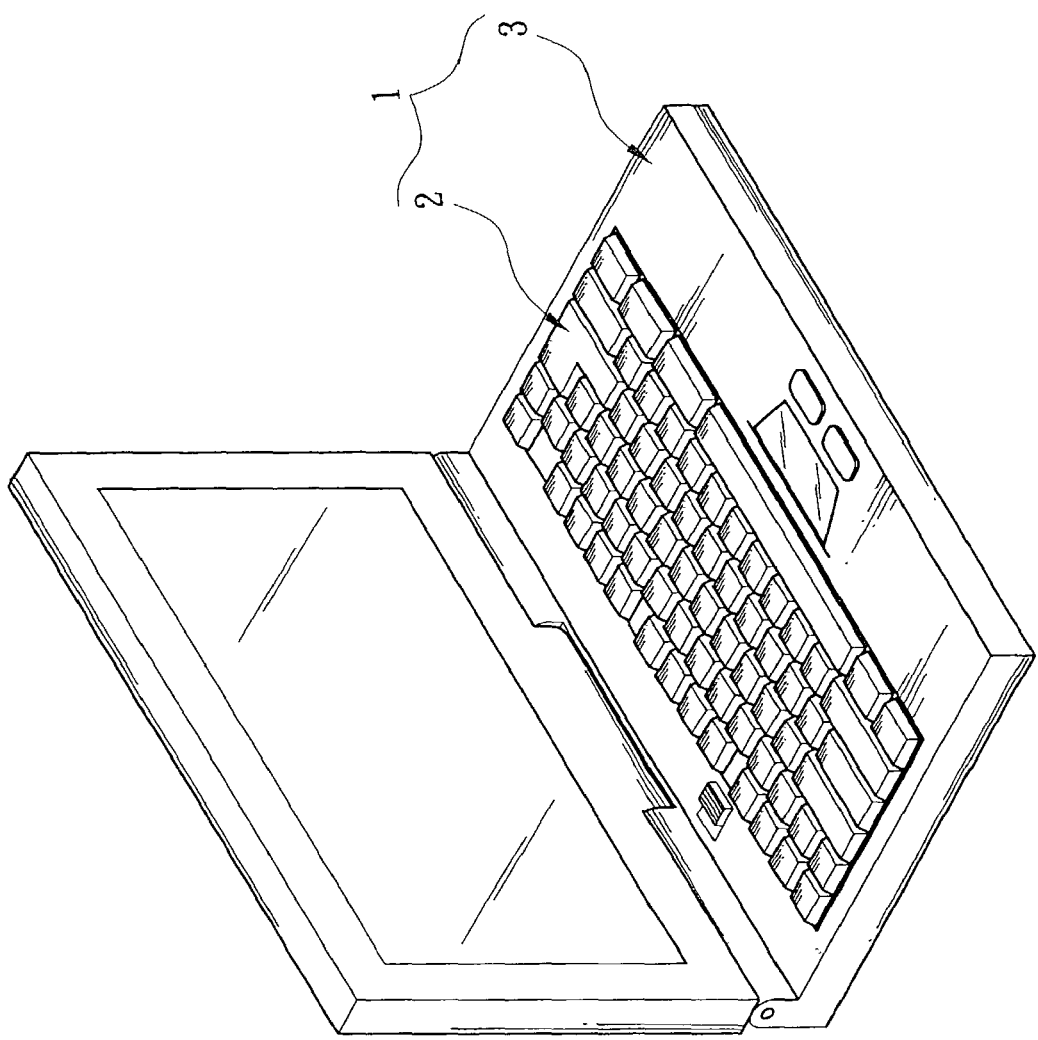
FIGS. 1A through 1C are schematic views of the invention.
Figure 1B:
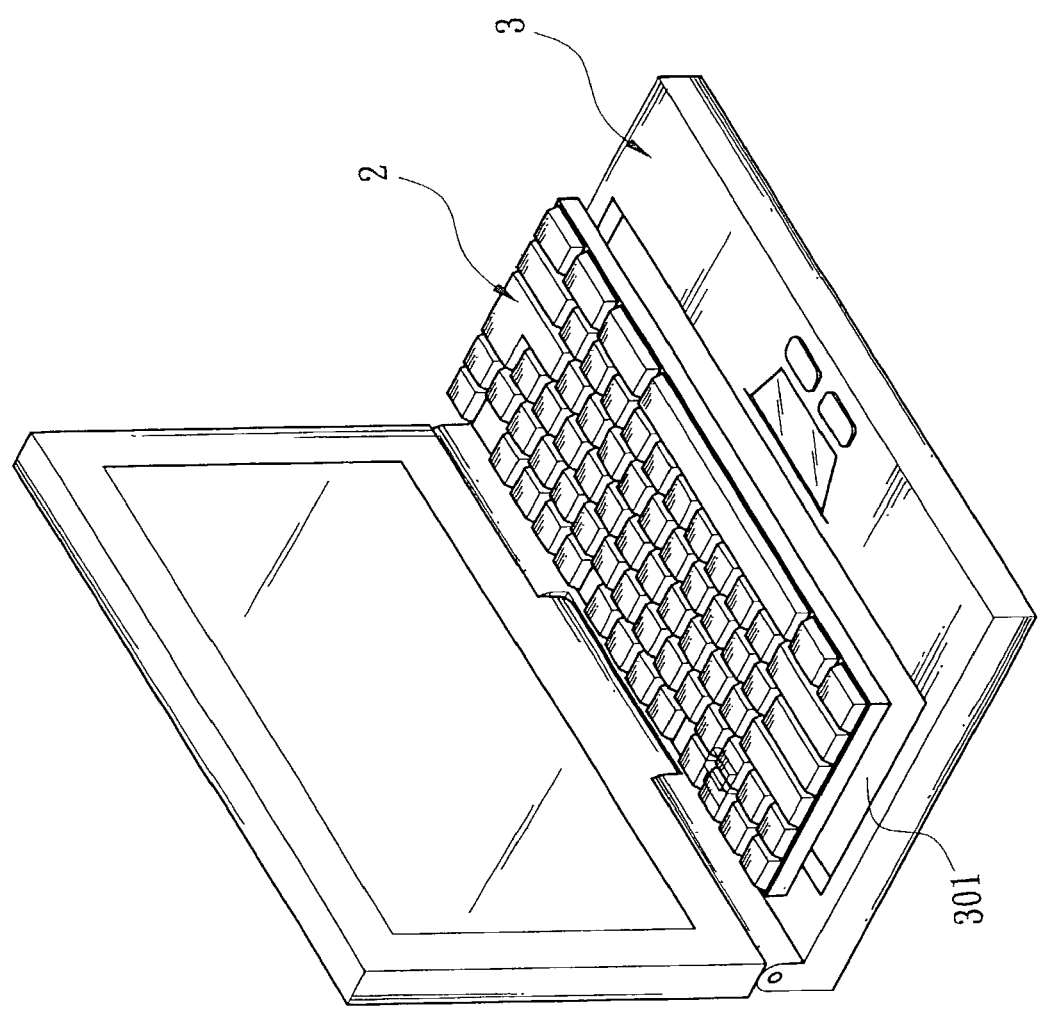
Figure 1C:
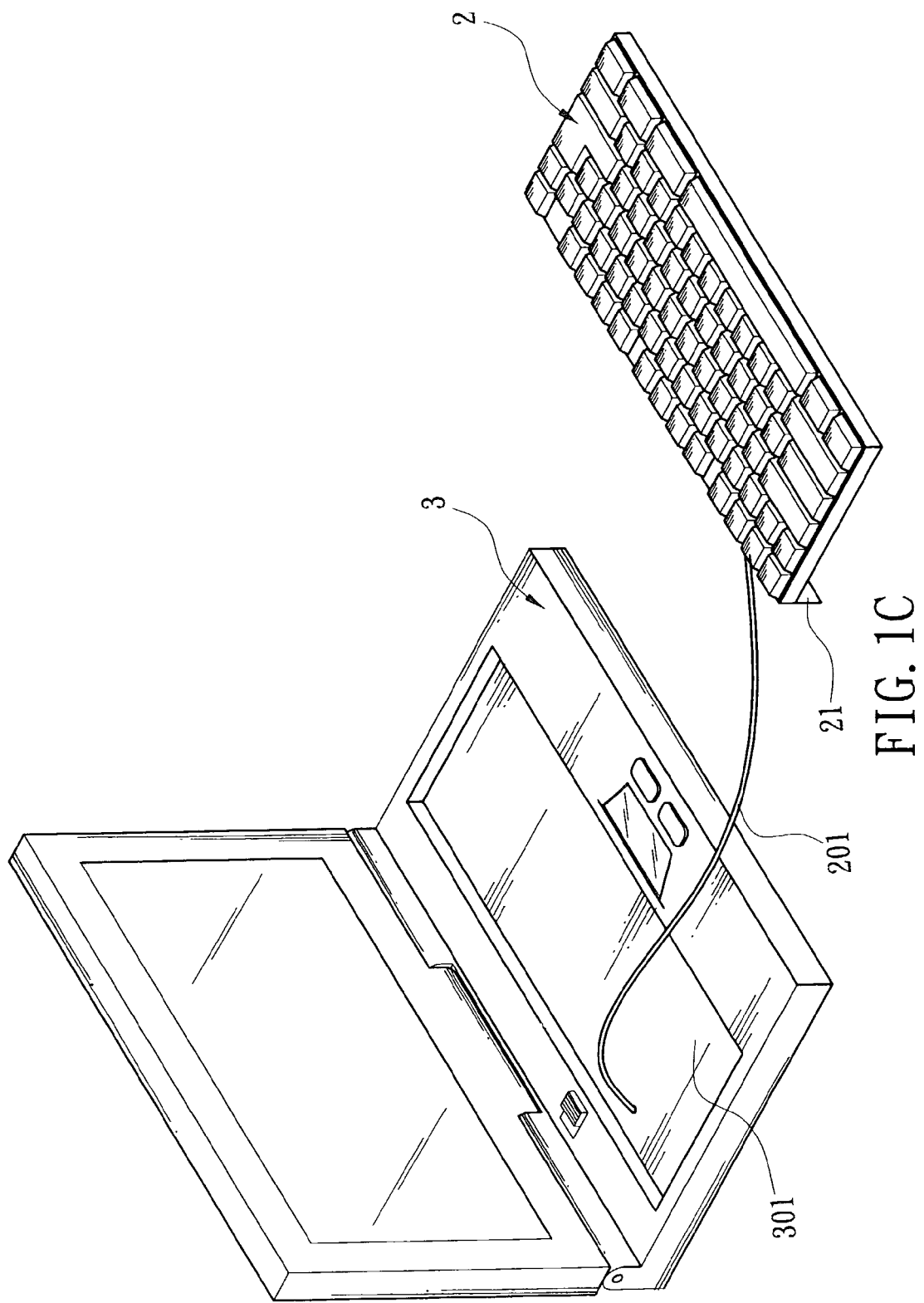

Referring to FIG. 1A, the notebook computer with a detachable keyboard according to the invention includes a notebook computer main body 3 and a keyboard module 2. The keyboard module 2 is held in a housing chamber 301 formed on the notebook computer main body 3. The keyboard module 2 may be fixedly mounted in the housing chamber 301 or be detached from the housing chamber 301 (as shown in FIG. 1B). The keyboard module 2 and the notebook computer main body 3 have electric connection through a conductive line 201 (of course, the electric connection may also be accomplished through wireless means in which the keyboard module 2 has a radio transmitter located on one side thereof, and the notebook computer main body 3 has a radio receiver located on another side thereof). When in operation, the keyboard module 2 may be detached from the notebook computer main body 3 and lifted to a selected angle through the support bracket 21 to conform to ergonomics so that users can operate the keyboard without becoming fatigued.

Figure 2:
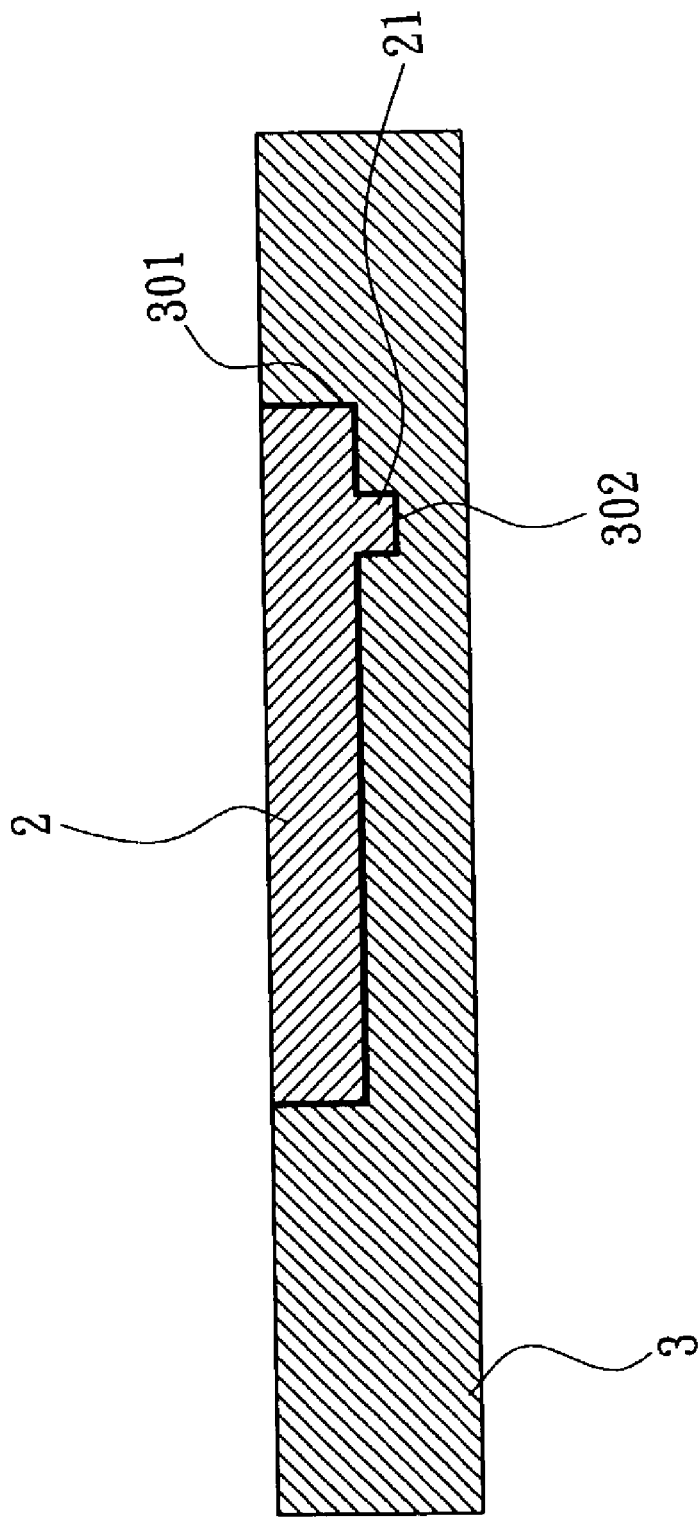
FIG. 2 is a schematic view of a first embodiment of the support bracket of the invention.
Figure 3A:
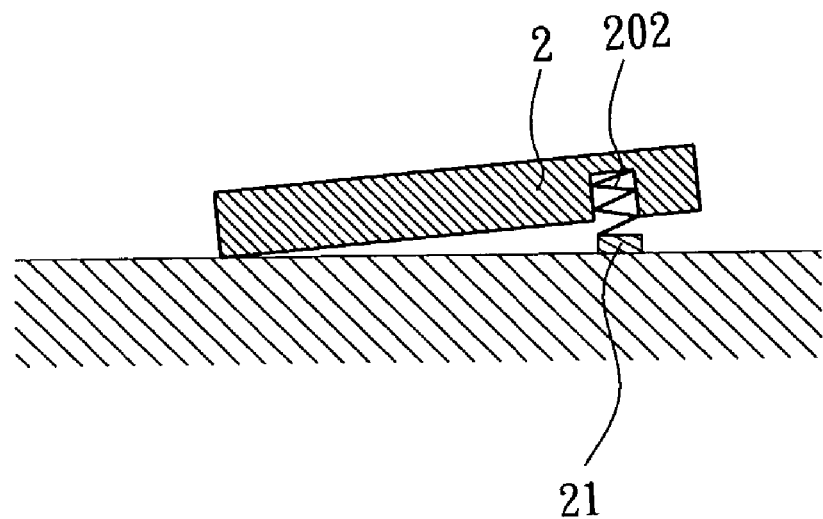
FIGS. 3A and 3B are schematic views of a second embodiment of the support bracket of the invention.
Figure 3B:
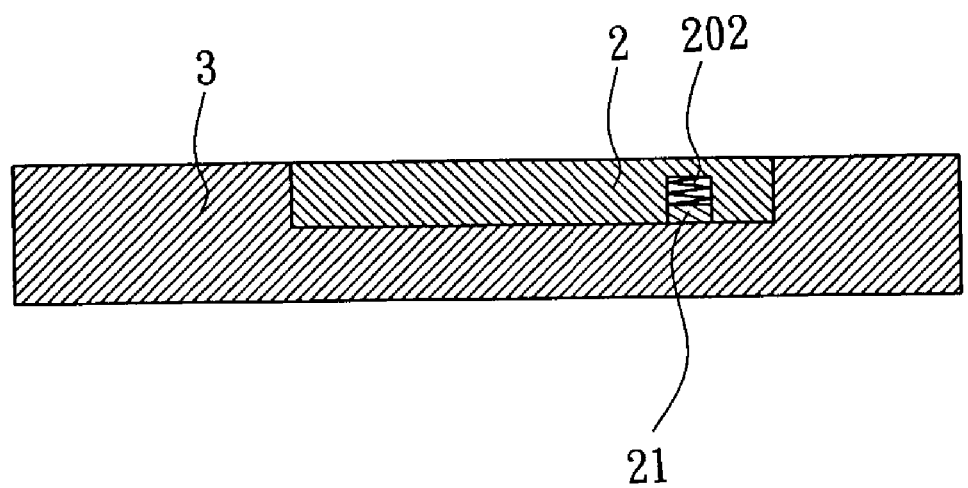

The support bracket 21 may have various designs. FIG. 2 shows a first embodiment in which the support bracket 21 is adopted a fixed design. When not in use, the keyboard module 2 is mounted in the housing chamber 301 of the notebook computer main body 3. In the housing chamber 301, there is a recess 302 for holding the support bracket 21. When in use, the keyboard module 2 may be detached from the notebook computer main body 3 and raised to a selected angle. FIG. 3A illustrates a second embodiment of the invention in which an elastic element 202 (such as a spring) is provided and located on the rear side of the support bracket 21 to give the keyboard module 2 extensibility in the direction facing the keyboard module 2. For storing, the keyboard module 2 is held in the housing chamber 301 (shown in FIG. 3B) and the support bracket 21 depresses the elastic element 202 to allow the keyboard module 2 to fit in the housing chamber 301. Such a design does not need the recess 302. Of course, in practical use, the keyboard module 2 may be kept on the notebook computer main body 3 without separating completely. The keyboard module 2 may be directly raised to a selected height in an inclined manner in the housing chamber 301 through the support bracket 21.

Figure 4:
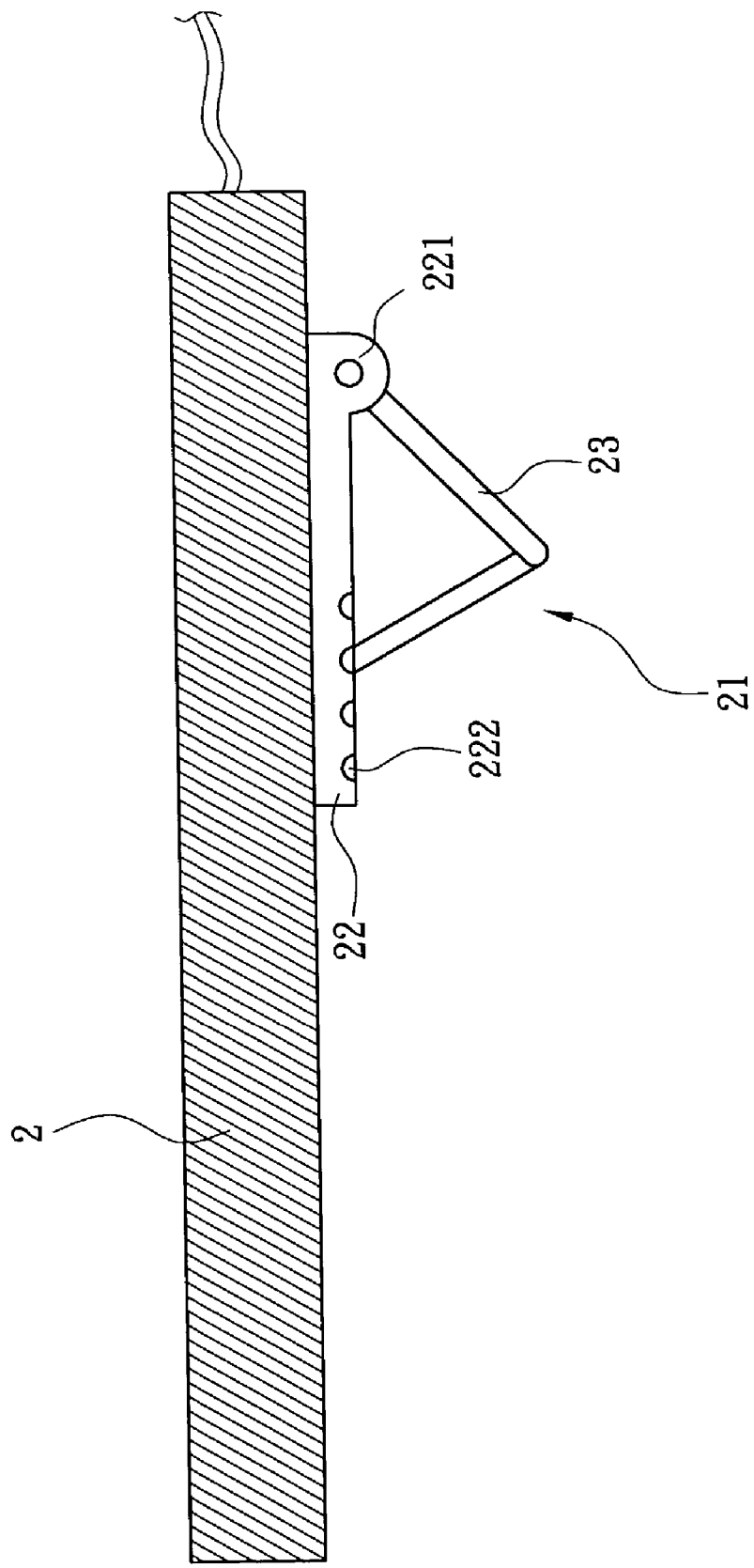
FIG. 4 is a schematic view of a third embodiment of the support bracket of the invention.

Referring to FIG. 4 for a third embodiment of the invention, which allows the keyboard module 2 to be lifted to different angles, the support bracket 21 includes an anchor board 22 and a leg bracket 23. The anchor board 2 is fixedly mounted to the bottom section of the keyboard module 2 and has one end forming a pivotal connection seat 221 and another end forming a plurality of anchor slots 222. The leg bracket 23 consists of two plates pivotally connecting with each other. The leg bracket 23 has one end pivotally engaging with the pivotal connection seat 221 and another end selectively anchoring on one of the anchor slots 222. For storing, one end of the leg bracket 23 may be anchored on the farthest anchor slot 222 (the leftmost one shown in the drawing) to allow the leg bracket 23 to extend straight so that the keyboard module 2 may be held in the housing chamber 301. When in use, one end of the leg bracket 23 may be moved and anchored on one of the other anchor slots 222 to support the keyboard module 2 at a selected angle.

Figure 5A:
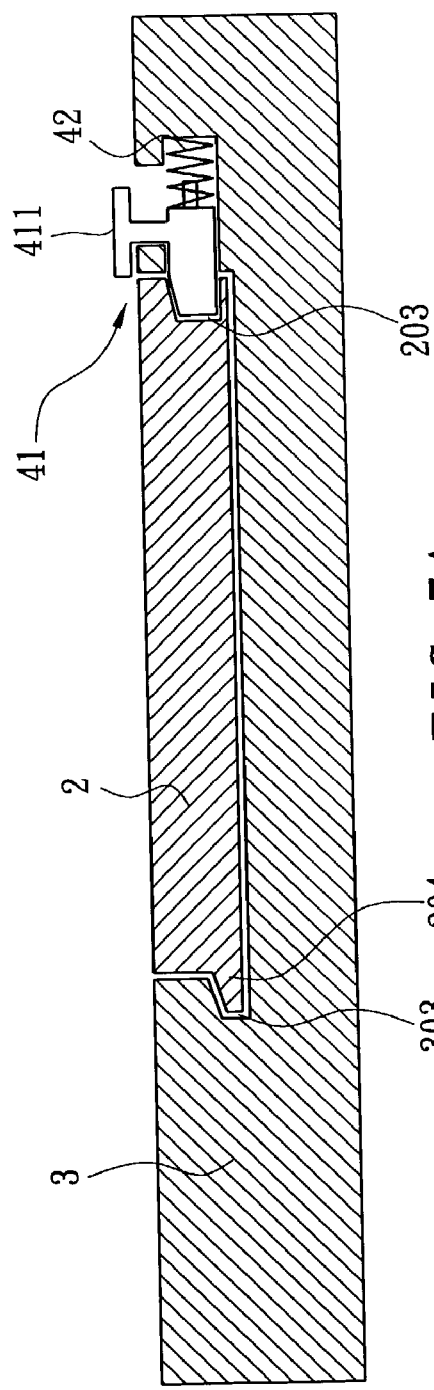
FIGS. 5A and 5B are schematic views of the keyboard module anchor unit of the invention.

In order to hold the keyboard module 2 more securely in the housing chamber 301, an anchor unit 4 may be added in the housing chamber 301 as shown in FIG. 5A. The keyboard module 2 has one side forming a latch hook 304 to latch in a first latch groove 303 formed on a side wall of the housing chamber 301. The anchor unit 4 further includes a tenon 41 and an elastic element 42 (which may also be a spring). The tenon 41 is installed on another side of the housing chamber 301 with the elastic element 42 located on a rear side thereof The tenon 41 extends towards the housing chamber 301 and may be latched in a second latch groove 203 formed on another side of the keyboard module 2. The elastic element 42 is used to maintain the latched condition so that the keyboard module 2 may be securely held in the housing chamber 301.

Figure 5B:
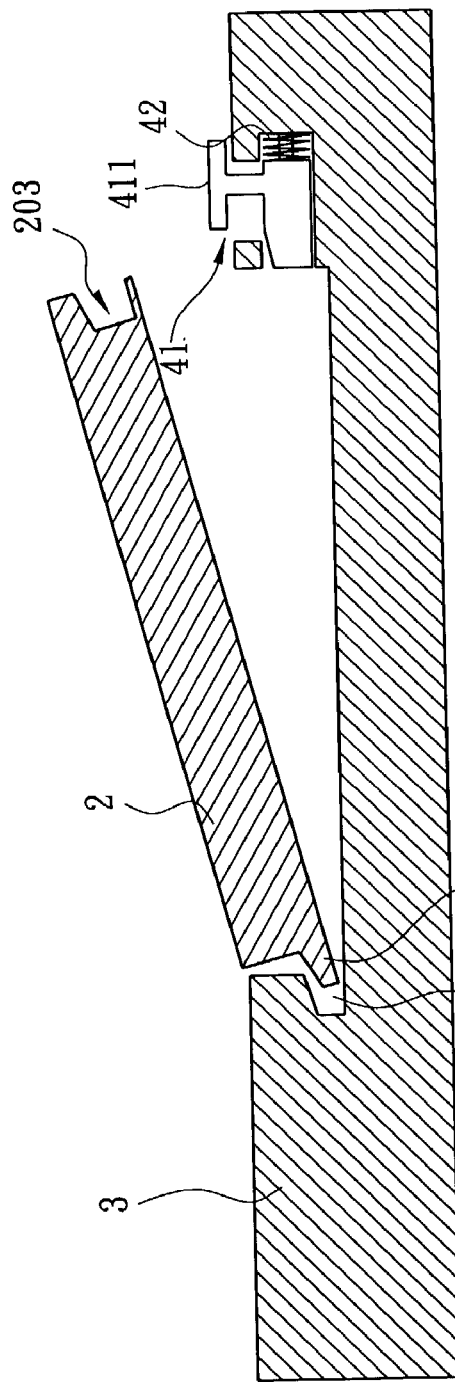

When detaching the keyboard module 2 from the notebook computer main body 3, push an exposed trigger ledge 411 of the tenon 41 towards the outer side of the housing chamber 301 to depress the elastic element 42 and make the elastic element 42 contract in the tenon 41. The tenon 41 may then be unlatched from the second larch groove 203, as shown in FIG. 5B. That side of the keyboard module 2 may be lifted and detached from the housing chamber 301, and the latch hook 304 may be separated from the first latch groove 303. Thus the keyboard module 2 may be detached and raised to a selected angle for use. The construction thus formed can better conform to human hand ergonomics.

In summary, the invention can achieve the following functions:

The notebook computer with a detachable keyboard according to the invention includes a notebook computer main body and a keyboard module. The notebook computer main body has a housing chamber for holding the keyboard module. The keyboard module has a bottom section equipped with a support bracket. When in use, the keyboard module may be detached from the notebook computer main body, and through the support bracket on the bottom section lifted to a desired angle to conform to ergonomics so that users may comfortably operate the keyboard without becoming fatigued.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A notebook computer with a detachable keyboard, comprising:
a notebook computer main body having a housing chamber; and
a keyboard module detachably housed in the housing chamber and connecting electrically to the notebook computer main body and having a bottom section engaging with a support bracket, the keyboard module being allowed to raise in an inclined manner at a selected angle through the support bracket to the facilitate user operations;
said support bracket has an adjustable height for adjusting the keyboard module at a selected angle, and said support bracket including an anchor board fixedly located on the bottom section of the keyboard module having one end formed a pivotal connection seat and another end formed a plurality of anchor slots; and
a leg bracket being foldable and having one end pivotally engaging with the pivotal connection seat of the anchor board and another end selectively anchoring on one of the anchor slots such that the leg bracket is extendable for a selected height relative to the keyboard module for raising the keyboard module in an inclined manner at a selected angle.

2. The notebook computer with a detachable keyboard of claim 1, wherein the electric connection between the keyboard module and the notebook computer main body is accomplished through a connection line.

3. The notebook computer with a detachable keyboard of claim 1, wherein the electric connection between the keyboard module and the notebook computer main body is accomplished through a wireless means.

4. The notebook computer with a detachable keyboard of claim 1, wherein the keyboard has a first side equipped with a radio transmitter, and the notebook computer main body has a second side equipped with a radio receiver for electrically connecting the keyboard module.

5. The notebook computer with a detachable keyboard of claim 1 further having an anchor unit for anchoring the keyboard module in the housing chamber.

6. The notebook computer with a detachable keyboard of claim 5, wherein the anchor unit includes:
a tenon located on one side of the housing chamber of the notebook computer main body extending into the housing chamber for latching in a first latch groove formed on the keyboard module; and
an elastic element located on one side of the tenon to allow the tenon and first latch groove to form a latched condition in normal circumstances.

7. The notebook computer with a detachable keyboard of claim 6, wherein the tenon has an exposed trigger ledge to allow users to move for releasing the latched condition.

8. The notebook computer with a detachable keyboard of claim 6, wherein the keyboard module has a latch hook formed on another side thereof opposite to the first latch groove for latching in a second latch groove formed on a side wall of the housing chamber for securely anchoring the keyboard module.

9. A notebook computer with a detachable keyboard, comprising:
- a notebook computer main body having a housing chamber; and
- a keyboard module detachably housed in the housing chamber and connecting electrically to the notebook computer main body and having a bottom section engaging with a support bracket, the keyboard module being allowed to raise in an inclined manner at a selected angle through the support bracket to facilitate user operations; and wherein the housing chamber has a recess for holding the support bracket of the keyboard module.

10. The notebook computer with a detachable keyboard of claim 9, wherein the electric connection between the keyboard module and the notebook computer main body is accomplished through a connection line.

11. The notebook computer with a detachable keyboard of claim 9, wherein the electric connection between the keyboard module and the notebook computer main body is accomplished through a wireless means.

12. The notebook computer with a detachable keyboard of claim 9, wherein the kcyboard has a first side equipped with a radio transmitter, and the notebook computer main body has a second side equipped with a radio receiver for electrically connecting the keyboard module.

13. The notebook computer with a detachable keyboard of claim 9 further having an anchor unit for anchoring the keyboard module in the housing chamber.

14. The notebook computer wit a detachable keyboard of claim 13, wherein the anchor unit includes:
- a tenon located on one side of the housing chamber of the notebook computer main body extending into the housing chamber for latching in a first latch groove formed on the keyboard module; and
- an elastic element located on one side of the tenon to allow the tenon and first latch groove to form a latched condition in normal circumstances.

15. The notebook computer wit a detachable keyboard of claim 14, wherein the tenon has an exposed trigger ledge to allow users to move for releasing the latched condition.

16. The notebook computer with a detachable keyboard of claim 14, wherein the keyboard module has a latch hook formed on another side thereof opposite to the first latch groove for latching in a second latch groove formed on a side wall of the housing chamber for securely anchoring the keyboard module.

17. A notebook computer with a detachable keyboard, comprising:
- a notebook computer main body having a housing chamber; and a keyboard module detachably housed in the housing chamber connecting electrically to the notebook computer main body and having a bottom section engaging with a support bracket, the keyboard module being allowed to raise in an inclined manner at a selected angle through the support bracket to facilitate user operations; and wherein the support bracket is extendable towards the keyboard module to allow the keyboard module to be embedded in the housing chamber of the notebook computer main body.

18. The notebook computer with a detachable keyboard of claim 17, wherein the electric connection between the keyboard module and the notebook computer main body is accomplished through a connection line.

19. The notebook computer with a detachable keyboard of claim 17, wherein the electric connection between the keyboard module and the notebook computer main body is accomplished through a wireless means.

20. The notebook computer with a detachable keyboard of claim 17, wherein the keyboard has a first side equipped with a radio transmitter, and the notebook computer main body has a second side equipped with a radio receiver for electrically connecting the keyboard module.

21. The notebook computer with a detachable keyboard of claim 17 further having an anchor unit for anchoring the keyboard module in the housing chamber.

22. The notebook computer with a detachable keyboard of claim 21, wherein the anchor unit includes:
- a tenon located on one side of the housing chamber of the notebook computer main body extending into the housing chamber for latching in a first latch groove formed on the keyboard module; and
- an elastic element located on one side of the tenon to allow the tenon and first latch groove to form a latched condition in normal circumstances.

23. The notebook computer with a detachable keyboard of claim 22, wherein the tenon has an exposed trigger ledge to allow users to move for releasing the latched condition.

24. The notebook computer with a detachable keyboard of claim 22, wherein the keyboard module has a latch hook formed on another side thereof opposite to the first latch groove for latching in a second latch groove formed on a side wall of the housing chamber for securely anchoring the keyboard module.

* * * * *